United States Patent Office 3,168,532
Patented Feb. 2, 1965

3,168,532
1,5-DIARYLPYRROLE-2-PROPIONIC ACID COMPOUNDS
Franklin Willard Short, Ann Arbor, Mich., assignor to Parke, Davis & Company, Detroit, Mich., a corporation of Michigan
No Drawing. Filed June 12, 1963, Ser. No. 287,212
5 Claims. (Cl. 260—326.3)

This invention relates to phenolic compounds having a pyrrole nucleus. More particularly, it relates to 1,5-diarylpyrrole-2-propionic acid compounds of the formula

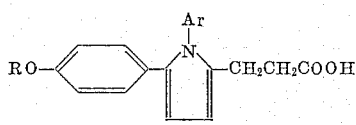

to salts and lower alkyl esters of said compounds and to methods for their production. In the foregoing formula, R represents hydrogen or a hydrocarbon acyl radical of not more than 8 carbon atoms and Ar represents α-naphthyl, o-methoxyphenyl, o-methylthiophenyl, or a substituted phenyl radical of the formula

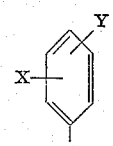

where X represents methyl or halogen and Y represents hydrogen, methyl or halogen. In the case of the lower alkyl esters of the invention, the lower alkyl radicals are preferably those containing not more than 4 carbon atoms.

In accordance with the invention, 1,5-diarylpyrrole-2-propionic acids of the foregoing formula and salts and lower alkyl esters of said compounds can be produced by reacting 6-aroyl-4-oxohexanoic acid compounds of the formula

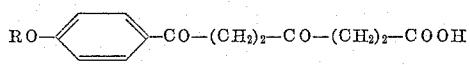

or salts or lower alkyl esters thereof with compounds of the formula $$Ar-NH_2$$

where R and Ar are as defined before. The reaction can be carried out in an unreactive solvent such as toluene, benzene, acetic acid, ethanol, aqueous ethanol, dioxane, dimethylacetamide, tetrahydrofuran or mixtures thereof. Preferred solvents are acetic acid and toluene. In those cases where one of the reactants is a liquid at the reaction temperature the process can also be carried out without an added solvent. A catalyst such as p-toluenesulfonic acid, benzenesulfonic acid, ethanesulfonic acid, hydrochloric acid, sulfuric acid or other strong acid can be added to the reaction mixture. The process is normally carried out using approximately equimolar quantities of reactants, or a moderate excess of either can be used. The temperature at which the reaction is carried out is not critical. A range of approximately 50° C. to 200° C. is satisfactory, a preferred temperature being from 80° C. to 120° C. Depending on the particular reactants and the temperature, the time required for completion of the reaction varies from a few minutes to a few days. With acetic acid or toluene at the reflux temperature, the reaction is usually substantially complete in less than 24 hours, generally within less than 5 hours.

The product can be isolated in the form of a carboxylic acid or a salt or lower alkyl ester thereof, and in the form of a free phenol or a hydrocarbon acyl derivative thereof. The carboxylic acids can be converted to salts by reaction with a variety of organic or inorganic bases. Non-toxic salts are formed by reaction with bases such as sodium hydroxide, potassium hydroxide, calcium hydroxide, sodium carbonate, ammonia, 2-hydroxyethylamine and choline. If more than one equivalent of base is used, the free phenolic group is also converted to a salt form. The salts can be converted to the free carboxylic acids by treatment of an aqueous solution of the salt with a mineral acid. The carboxylic acids can be converted to their lower alkyl esters by esterification, such as by heating the carboxylic acid in a lower alkanol containing a small amount of a strong acid. The free phenols can be converted to their hydrocarbon acyl derivatives by reaction with a hydrocarbon carboxylic acid or a reactive derivative thereof such as acetic anhydride, propionic anhydride, propionyl chloride, hexanoyl chloride and benzoyl chloride. The lower alkyl esters and the hydrocarbon acyl derivatives can be converted to the free carboxylic acids and the free phenols by hydrolysis, as by heating in aqueous methanol with sodium hydroxide or potassium hydroxide and then acidifying the mixture.

The 6-aroyl-4-oxohexanoic acid compounds employed as starting materials in the process of the invention can be prepared by general procedures already described in the literature. As an example, p-hydroxyacetophenone is condensed with 2-furaldehyde of the formula

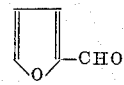

to yield 3-(2-furyl)-4'-hydroxyacrylophenone which is then reacted with concentrated hydrochloric acid in ethanol followed by dilute aqueous acid to yield 6-(p-hydroxybenzoyl)-4-oxohexanoic acid. The procedures are described in Berichte, 34, 1263 (1901), Chemical Abstracts, 41, 3797 (1947) and various other publications. The 6-(p-hydroxybenzoyl)-4-oxohexanoic acid can be converted to its salts and lower alkyl esters by mild treatment with a base or with a mild esterifying reagent. It can be converted to its hydrocarbon acyl derivatives by reaction with an acid anhydride or acid halide.

The products of the invention are useful as pharmacological agents and as chemical intermediates. They are hypocholesteremic agents and are of value in reducing the level of blood cholesterol with comparative freedom from estrogenic side effects. They are active upon either oral or parenteral administration and oral administration is preferred. They can be employed in either free acid, salt or lower alkyl ester form depending on the solubility properties desired.

This is a continuation-in-part of application Serial No. 202,391 filed June 14, 1962, now abandoned.

The invention is illustrated by the following examples.

Example 1

A solution of 10.0 g. of 6-(p-hydroxybenzoyl)-4-oxohexanoic acid and 4.2 ml. of o-toluidine in 50 ml. of glacial acetic acid is heated under reflux for 5 hours and diluted with hot water. The mixture is cooled and the 1 - (o - tolyl) - 5 - (p - hydroxyphenyl) - pyrrole - 2 - propionic acid which separates is collected on a filter; M.P. 144–145° C. following crystallization from benzene.

A stirred solution of 4.0 g. of 1-(o-tolyl)-5-(p-hydroxyphenyl)-pyrrole-2-propionic acid in 23.8 ml. of 1-normal sodium hydroxide solution and 50 ml. of water is chilled and 0.9 ml. of acetic anhydride is added. The resulting mixture is stirred for one hour and acidified with acetic acid. The insoluble 1-(o-tolyl)-5-(p-acetoxyphenyl)-pyrrole-2-propionic acid which separates is collected; M.P. 178–192° C. following crystallization from isopropyl alcohol.

A solution of 1.1 g. of 1-(o-tolyl)-5-(p-hydroxyphenyl)-pyrrole-2-propionic acid and 0.07 g. of p-toluene-sulfonic acid in 7.0 ml. of methanol is heated under reflux for 4 hours and concentrated. The insoluble product which separates is 1-(o-tolyl)-5-(p-hydroxyphenyl)-pyrrole-2-propionic acid methyl ester; M.P. 90–92° C. following crystallization from aqueous methanol.

The starting material can be obtained as follows. 70 g. of 50% sodium hydroxide solution is added with shaking to a solution of 34 g. of p-hydroxyacetophenone and 24 g. of 2-furaldehyde in 300 ml. of ethanol. The mixture is cooled and acidified with acetic acid to yield 3-(2-furyl)-4'-hydroxyacrylophenone; M.P. 160–162° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. Alternatively the compound is boiled with about 5 times its weight of a solution of 2 parts by volume of ethanol to 1 part by volume of hydrochloric acid for about 16 hours, the ethanol is distilled off and the residue is boiled with a mixture of 4 parts of water, 1 part of hydrochloric acid and 1 part of acetic acid. The product is 6-(p-hydroxybenzoyl)-4-oxohexanoic acid, M.P. 142–144° C.

*Example 2*

A solution of 10.0 g. of 6-(p-hydroxybenzoyl)-4-oxohexanoic acid, 5.0 ml. of 2,6-dimethylaniline and 10 mg. of p-toluenesulfonic acid in 50 ml. of glacial acetic acid is heated under reflux for 19 hours, stirred with charcoal, filtered and diluted with 70 ml. of hot water. The 1 - (2,6 - xylyl) - 5 - (p - hydroxyphenyl) - pyrrole - 2-propionic acid which separates on cooling is collected on a filter; crystalline modifications M.P. 149–151° C. or M.P. 172–173° C. following crystallization from ethyl acetate-petroleum ether.

In the same manner reaction of 6-(p-hydroxybenzoyl)-4-oxohexanoic acid and 2,3-dimethylaniline yields 1-(2,3-xylyl-5-(p-hydroxyphenyl)-pyrrole-2-propionic acid, M.P. 175–177° C. following crystallization from ethyl acetate-cyclohexane.

A suspension of 5 g. of 1-(2,6-xylyl)-5-(p-hydroxyphenyl)-pyrrole-2-propionic acid in 250 ml. of warm water is titrated with 150 ml. of 0.1-normal sodium hydroxide solution and the resulting solution is filtered. The filtrate is evaporated to dryness to give 1-(2,6-xylyl)-5-(p-hydroxyphenyl)-pyrrole-2-propionic acid sodium salt. The potassium, ammonium and ethanolamine salts are prepared by reaction of the free acid with, respectively, potassium hydroxide solution, aqueous ammonia and 2-hydroxyethylamine solution.

A stirred solution of 5.2 g. of 1-(2,6-xylyl)-5-(p-hydroxyphenyl)-pyrrole-2-propionic acid in 31.0 ml. of 1-normal sodium hydroxide solution is chilled by the addition of ice and 1.5 ml. of acetic anhydride is added. The mixture is stirred for 3 hours, acidified with 1.8 ml. of glacial acetic acid and stirred for an additional hour. The insoluble 1-(2,6-xylyl)-5-(p-acetoxyphenyl)-pyrrole-2-propionic acid is collected on a filter; M.P. 170–172° C. following crystallization from aqueous ethanol. By reaction in a similar manner with propionic anhydride, butyric anhydride, isobutyric anhydride, valeric anhydride, hexanoic anhydride and benzoyl chloride in place of the acetic anhydride, the following phenolic esters are obtained: propionate, M.P. 154–156° C. following crystallization from aqueous methanol; butyrate, M.P. 124–126° C. following crystallization from aqueous ethanol; isobutyrate, M.P. 140–143° C. following crystallization from aqueous methanol; valerate, M.P. 107–110° C. following crystallization from aqueous methanol; hexanoate, M.P. 117–119° C. following crystallization from aqueous methanol; benzoate, M.P. 84–124° C.

A solution of 2.0 g. of 1-(2,6-xylyl)-5-(p-hydroxyphenyl)-pyrrole-2-propionic acid and 0.1 g. of p-toluenesulfonic acid in 10 ml. of absolute ethanol is heated under reflux for 4 hours and concentrated. The insoluble product which separates is 1-(2,6-xylyl)-5-(p-hydroxyphenyl)-pyrrole-2-propionic acid ethyl ester; M.P. 114–116° C. following crystallization from aqueous ethanol. The corresponding methyl ester is obtained by substituting anhydrous methanol for the absolute ethanol.

*Example 3*

A solution of 10.0 g. of 6-(p-hydroxybenzoyl)-4-oxohexanoic acid and 5.3 g. of 2-chloro-6-methylaniline in 50 ml. of glacial acetic acid is heated under reflux for 17 hours and diluted with hot water. The aqueous phase is removed by decantation and the insoluble 1-(6-chloro-o-tolyl)-5-(p-hydroxyphenyl)-pyrrole-2-propionic acid is crystallized from aqueous isopropyl alcohol; M.P. 122–139° C.

By the foregoing procedure with the substitution of an equivalent amount of 3-chloro-2-methylaniline for the 2-chloro-6-methylaniline, the product obtained is 1-(3-chloro-o-tolyl) - 5 - (p-hydroxyphenyl)-pyrrole-2-propionic acid, M.P. 175–177° C. following crystallization from aqueous methanol. The methyl ester is prepared by refluxing the acid in methanol containing a small amount of p-toluene-sulfonic acid; M.P. 119–121° C. following crystallization from aqueous methanol.

By the foregoing procedure with the substitution of an equivalent amount of 3-chloro-2,6-dimethylaniline for the 2-chloro-6-methylaniline, the product is 1-(3-chloro-2,6-xylyl)-5-(p-hydroxyphenyl)-pyrrole-2-propionic acid; M.P. 135–137° C. following crystallization from aqueous ethanol and from benzene-hexane.

*Example 4*

A mixture of 10.0 g. of 6-(p-hydroxybenzoyl)-4-oxohexanoic acid and 3.8 ml. of p-fluoroaniline in 50 ml. of toluene is heated under reflux for 4 hours with continuous removal of the water formed in the condensate. The mixture is chilled and the insoluble 1-(p-fluorophenyl)-5-(p-hydroxyphenyl)-pyrrole-2-propionic acid which separates is collected on a filter; M.P. 158–159° C. following crystallization from isopropyl alcohol.

By the foregoing procedure, with the substitution of an equivalent amount of o-fluoroaniline for the p-fluoroaniline, the product obtained is 1-(o-fluorophenyl)-5-(p-hydroxyphenyl)-pyrrole-2-propionic acid; M.P. 164–166° C. following crystallization from aqueous ethanol.

By the foregoing procedure, with the substitution of an equivalent amount of 2,5-difluoroaniline for the p-fluoroaniline, the product obtained is 1-(2,5-difluorophenyl)-5-(p-hydroxyphenyl)-pyrrole-2-propionic acid; M.P. 166–168° C. following crystallization from aqueous ethanol.

*Example 5*

A mixture of 10.0 g. of 6-(p-hydroxybenzoyl)-4-oxohexanoic acid, 4.2 ml. of o-chloroaniline and 10 mg. of p-toluenesulfonic acid in 75 ml. of toluene and 52 ml. of xylene is heated under reflux for 26 hours with continuous removal of the water formed in the condensate. The mixture is concentrated and the insoluble 1-(o-chlorophenyl)-5-(p-hydroxyphenyl)-pyrrole-2-propionic acid which separates is collected; M.P. 147–150° C. following crystallization from ethyl acetate-cyclohexane.

*Example 6*

A mixture of 15.0 g. of 6-(p-hydroxybenzoyl)-4-oxohexanoic acid, 7.7 g. of p-chloroaniline and 10 mg. of p-toluenesulfonic acid in 100 ml. of toluene is heated under reflux for 24 hours with continuous removal of the water formed in the condensate. The mixture is concentrated and the insoluble 1-(p-chlorophenyl)-5-(p-hydroxyphenyl)-pyrrole-2-propionic acid which separates is collected, M.P. 195–197° C. following crystallization from aqueous ethanol and from ethyl acetate-petroleum ether.

By esterification of 1-(p-chlorophenyl)-5-(p-hydroxyphenyl)-pyrrole-2-propionic acid with acetic anhydride, the product obtained is 1-(p-chlorophenyl)-5-(p-acetoxyphenyl)-pyrrole-2-propionic acid; M.P. 191–193° C. following crystallization from aqueous ethanol.

*Example 7*

A solution of 10.0 g. of 6-(p-hydroxybenzoyl)-4-oxohexanoic acid, 5.7 g. of α-naphthylamine and 1 mg. of p-toluenesulfonic acid in 50 ml. of toluene is heated under reflux for 2 hours, with continuous removal of the water formed in the condensate. The solvent is removed by distillation and the residue of 1-(α-naphthyl)-5-(p-hydroxyphenyl)-pyrrole-2-propionic acid is collected; M.P. 169–170° C. following crystallizations from ethanol, isopropyl alcohol, ethyl acetate-cyclohexane and aqueous isopropyl alcohol.

*Example 8*

A solution of 16.0 g. of 6-(p-hydroxybenzoyl)-4-oxohexanoic acid and 8.0 g. of o-anisidine in 70 ml. of glacial acetic acid is heated under reflux for 5 hours, cooled and diluted with 100 ml. of water. The insoluble 1-(o-methoxyphenyl)-5-(p-hydroxyphenyl)-pyrrole-2-propionic acid which separates is collected; M.P. 141–143° C. following crystallization from aqueous methanol.

*Example 9*

A solution of 10.0 g. of 6-(p-hydroxybenzoyl)-4-oxohexanoic acid and 5.6 g. of o-methylthionaniline in 50 ml. of glacial acetic acid is heated under reflux for 16 hours and diluted with 90 ml. of water. The mixture is cooled and the insoluble 1-(o-methylthiophenyl)-5-(p-hydroxyphenyl)-pyrrole-2-propionic acid which separates is collected on a filter and washed with dilute acetic acid; M.P. 181–182.5° C. following crystallizations from aqueous acetic acid and from aqueous ethanol.

I claim:

1. A member of the class consisting of compounds of the formula

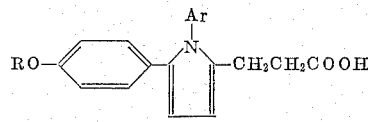

non-toxic salts of said compounds and lower alkyl esters of said compounds; where R is a member of the class consisting of hydrogen and hydrocarbon acyl radicals of fewer than 9 carbon atoms and Ar is a member of the class consisting α-naphthyl, o-methoxyphenyl, o-methylthiophenyl, and substituted phenyl radicals of the formula

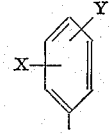

where X is selected from among methyl and halogen and Y is selected from the group consisting of hydrogen, methyl and halogen.

2. 1 - (2,6-xylyl)-5-(p-hydroxyphenyl)-pyrrole-2-propionic acid.

3. 1 - (2,6-xylyl)-5-(p-isobutyryloxyphenyl)-pyrrole-2-propionic acid.

4. 1 - halophenyl-5-(p-hydroxyphenyl)-pyrrole-2-propionic acid.

5. 1 - (α-naphthyl) - 5-(p-hydroxyphenyl)-pyrrole-2-propionic acid.

References Cited in the file of this patent

Blicke et al.: "J. Am. Chem. Society," pages 1675–77, vol. 66 (1944).

Holdsworth et al.: "Chemical Abstracts," vol. 31 page 6653 (1937).